Patented June 2, 1953

2,640,842

UNITED STATES PATENT OFFICE 2,640,842

METAL-AUREOMYCIN COMPLEXES

Joseph F. Weidenheimer and Charles C. Reed, Pearl River, Lawrence Ritter, Spring Valley, and Sidney D. Upham, Pearl River, N. Y., assignors to American Cyanamid Company, New York, N. Y., a corporation of Maine No Drawing. Application August 10, 1949, Serial No. 109,616

12 Claims. (Cl. 260—439)

Our invention relates to the synthesis of metallic halide complexes of the antibiotic aureomycin, which compounds are characterized in having valuable therapeutic properties and useful physical properties. More particularly, these complexes have solubility characteristics which render them of interest, and additionally the complexes are less irritating upon administration than free aureomycin or its acid salts. Aureomycin has been found to be a naphthacene derivative and while having a structure which strongly suggests tautomeric forms, is believed to exist with the following probable structure:

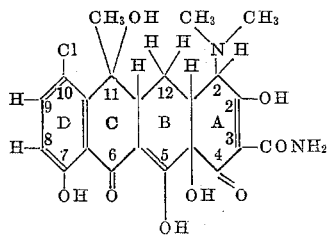

A numbering system is shown for the molecule. One proper name for the compound is 1-dimethylamino - 4,6 - dioxo - 10 - chloro - 11-methyl - 2,4a,5,7,11 - pentahydroxy - 1,4,4a,6,11, 11a,12,12a - octahydronaphthacene - 3 - carboxamide. A generic term for the compound is chlorotetracycline, which is consistent with the name oxytetracycline for terramycin as suggested in the Journal of the American Chemical Society, 74: 4976 (1952). Aureomycin itself is an antibiotic which is described in detail in the Annals of the New York Academy of Sciences, volume 51, article 2, page 175–342. This publication describes a sodium salt, a hydrochloride and the free base. The ethylenediamine salts of aureomycin are described in an application of Joseph F. Weidenheimer and Lawrence Ritter, Serial Number 83,780, filed March 26, 1949, entitled Aureomycin Salts, now abandoned, an abstract of the application appears @ 650 O. G. 895.

Any of these forms of aureomycin may, in accordance with this invention, be reacted with a halide of a metal selected from the group consisting of aluminum, cobalt, tin, zinc, boron, magnesium, bismuth, antimony, arsenic, iron and nickel by treatment in suitable solvents. The complexes formed are independent of the starting form of the aureomycin. The complexes are most easily formed from the hydrated forms of the metallic halides, which are in general in the group known as the Friedel-Crafts catalysts.

Whereas the several metals in the form of their hydrated halides may be used, aluminum and magnesium are most convenient because both aluminum and magnesium, as their hydroxides, are frequently used therapeutically; and the halides may hydrolyze thereto. Of the several halides, the chlorides are the most convenient because of price considerations, because of availability, and because of the fact that therapeutically, due to the large quantities of chlorides present in living organisms, the addition of small quantities of chloride ions has no appreciable effect upon the tissue salt balances. The metallic bromides may be used, for example aluminum bromide, but in the use of such complexes, allowance must be made for the sedative effect of the bromide ion, and use restricted to circumstances under which this effect is desired, or at least not deleterious. Similarly, the effect of the metallic component must be considered, and appropriate consideration made therefor. The arsenic chloride complex is one in which the arsenic is released when administered; but in turn, arsenic is a well known treatment for certain diseases, such as syphilis, and the use of the arsenic complex permits a dual therapeutic action, where such is indicated. The aluminum chloride complex is free from such side effects, and accordingly more universally acceptable.

The complexes formed are believed not to be true salts in the classic sense of the word but appear to be more of the Werner complex type, but nonetheless are sharply defined compounds. Usually a one to one molar ratio is most convenient. Certain of the advantages of our invention are obtained by using less than this ratio of the metallic halides giving in effect a mixture of the complex and the unreacted compound, but generally the full molar proportion of the metallic halide or a mixture of one or more of the halides gives better results than a lesser proportion.

The formation of the metallic halide complex is characterized in general by a sharp drop in the pH of the solution. This may be due to either the release of a free hydrohalide acid or to the formation of an acidic complex in which the halide is bound, or to a combination of the effects.

Our complex is characterized by a comparatively high solubility in water, in the neighborhood of 100 milligrams per milliliter for the aluminum chloride complex, and, as such, differs from the aureomycin, itself, as the hydrochloride or the free base, in that the complex solutions may be adjusted to a pH of between 4 and 4.5 without precipitation of the active components. At this pH the free base itself is extremely insoluble. However, when the pH is raised much above 4.5 with the complex formed from aluminum chloride in water for example, a heavy gelatinous precipitate forms and this characteristic renders the use of the product intravenously undesirable. The product is very convenient for intramuscular, subcutaneous, or oral use.

The aureomycin complex formation appears to be reversible. Its characteristics are somewhat different than that of aureomycin itself. For example, aureomycin solutions, when treated with ferric chloride, give an instantaneous and intense color reaction, whereas our complexes when so treated give a similar positive reaction, but very slowly. The optical rotation is significant in that for aureomycin hydrochloride $[\alpha]_D = -242$ at a pH of 2.8 and stays at approximately this value over the pH range, until the aureomycin precipitates out as it becomes more alkaline, and is about the same in methanol. However, for the aluminum chloride complex at a concentration of 7.4 milligrams per milliliter, the following values were obtained:

| pH | $[\alpha]_D$ |
| --- | --- |
|  | Degrees |
| 1.25 | −93.6 |
| 2.03 | −83.5 |
| 2.50 | −66.3 |
| 3.00 | −52.7 |
| 3.50 | −44.3 |
| 3.75 | −94.6 |
| 4.00 | −83.8 |
| 4.50 | −227 |
| 5.00 | −205 |

The sharp decrease in levorotation with complex formation may result from an additional asymmetric center. Antibiotically however, the material remains fully active.

Our complexes appear to be at least as stable or even slightly more stable than aureomycin itself. In one series of experiments starting with aureomycin aluminum chloride complex containing 5 milligrams of aureomycin per milliliter, analysis showed the residual aureomycin activity of the following for each pH after the time indicated:

| pH | Days at Room Temp. | |
| --- | --- | --- |
|  | 2 | 12 |
|  | Mg./ml. | Mg./ml. |
| 2.91 | 4.6 | 2.4 |
| 3.13 | 4.5 | 2.3 |
| 3.24 | 3.4 | 2.3 |
| 3.52 | 3.8 | 2.1 |
| 4.10 | 3.6 | 2.3 |
| 2.40 | 4.0 | 2.0 |
| 3.03 | 3.4 | 2.3 |
| 4.00 | 3.7 | 2.4 |
| 4.50 | 2.9 | 2.8 |
| 5.00 | 2.3 | 2.0 |

The metallic halide complexes may be retained in solution until used or may be isolated by any of several well known methods. Among the more common and convenient methods is by isolation from methanol, the material being formed in methanolic solution and the methanol removed by evaporation. The material may be formed in aqueous solution, frozen, and the moisture removed by sublimation from the frozen state; or the material may be separated by isoelectric precipitation. The isoelectric precipitation is theoretically a bit more complicated but in actual practice very simple. The complex may be prepared in the usual manner either in an alcohol or water; the pH adjusted to approximately 6 and the complex thereby precipitated almost quantitatively. In water the precipitate is gelatinous; in an alcoholic solution, the material is more readily filtered and the precipitate may be dried with acetone. This "pH6" precipitate is slightly soluble in water, is soluble in dilute acids and alkalis, is a yellow amorphous powder, and initially gives a negative ferric chloride test, although on standing the material develops a color.

Pharmacological tests have shown that the metallic halide complexes are comparatively acceptable to living organisms. Injections of 25 milligrams of aureomycin as the hydrochloride is severely irritating. The injection of the aluminum chloride complex containing as much as 100 milligrams of aureomycin causes no appreciable reaction, particularly if suspended in oil. It would appear that the aluminum chloride complex affects the portions of the aureomycin molecule which are responsible for tissue irritation, and as a result the material may be used therapeutically in this form with less danger of reaction than in any of the previously known forms. If less than molar proportions of aluminum chloride are used in the preparation of the complex, the irritating properties of the material are proportionately affected indicating that the material is in effect a mixture of the complex and the initial aureomycin, and the properties of each are comparatively uninfluenced by the other, as far as tissue irritation is concerned. The therapeutic effect obtained by introduction of aureomycin as a metallic halide complex appears to be at least as effective as would be obtained from the introduction of the same molar quantity of aureomycin.

Aluminum chloride is the best known of the metallic salts and accordingly meets with greater acceptance by the medical profession than the lesser known metallic salts. For this reason, more examples pertaining to this particular form are given.

EXAMPLE 1

*Aluminum chloride complex from aureomycin hydrochloride*

To 10.7 grams (0.02 mole) of aureomycin hydrochloride suspended in 200 milliliters of anhydrous methanol was added 2.8 milliliters (0.02 mole) of triethylamine. To the resultant clear solution was then added 4.8 grams (0.02 mole) of aluminum chloride hexahydrate dissolved in 40 milliliters of distilled water. (Anhydrous aluminum chloride in equimolecular proportions may be used but upon being dissolved in water, the solution is the same as that resulting from the hydrated form, but anhydrous aluminum chloride is a troublesome compound with which to work.) Upon mixing the two solutions at room temperature there resulted a deep red solution from which the methanol was removed by vacuum, leaving an aqueous solution with a pH of 1.0. The pH was adjusted to 3.50 with 10% sodium hydroxide and the volume adjusted to 100 milliliters with water. The solution theoretically contains 100 milligrams of aureomycin per milliliter. It analyzed as 98.6 milligrams per milliliter. The product may be isolated by freezing and subliming the moisture, or may be used in the liquid form.

EXAMPLE 2

*Aluminum chloride complex from free aureomycin*

To an aqueous solution of 2.41 grams (0.01 mole) of aluminum chloride hexahydrate in 100 milliliters of water was added 5 grams (0.01 mole) of crystalline aureomycin (free base). The suspension was stirred mechanically for 10–15 minutes at room temperature resulting in a clear medium-reddish-brown solution having a pH of about 1.5. The aureomycin aluminum chloride complex may be concentrated therefrom by freezing and removing the water by sublimation, resulting in a product substantially identical with that obtained in Example 1.

EXAMPLE 3

*Aluminum chloride complex from ethylenediamine aureomycin*

5.6 grams (0.01 mole) of ethylenediamine aureomycin was suspended in 150 milliliters of distilled water. To this suspension was then added with stirring 2.41 grams (0.01 mole) of aluminum chloride hexahydrate dissolved in 50 milliliters of water. The resultant mix was stirred for 20 minutes and a small quantity of undissolved material removed by filtration. The clear light reddish-brown solution thereby obtained had a pH of 4.58. The aureomycin aluminum chloride complex was isolated by freezing, then subliming off the moisture, resulting in a product substantially identical with that obtained in Example 1.

EXAMPLE 4

*Aluminum chloride complex from sodium aureomycin*

5.2 grams (0.01 mole) of crystalline sodium aureomycin was suspended in 50 milliliters of distilled water and thereto added a solution of 2.41 grams (0.01 mole) of aluminum chloride hexahydrate dissolved in 50 milliliters of water. After one hour of vigorous stirring a small undissolved residue was removed by filtration, yielding a brownish-red filtrate containing the aluminum chloride complex of aureomycin at a pH of 3.45 in solution. The material itself was isolated by freezing, and subliming off the moisture, being substantially the same as that in Example 1.

EXAMPLE 5

*Aluminum chloride complex in methanolic solution*

5 grams (0.01 mole) of crystalline aureomycin (free base) was added to 50 milliliters of methanol at room temperature. Thereto was added with stirring 2.41 grams (0.01 mole) of aluminum chloride hexahydrate in 10 milliliters of water. Thereby was obtained a clear red solution of the aluminum chloride complex of aureomycin in solution. The material itself was isolated by freezing after removal of the methanol in vacuo, followed by sublimation of the water.

EXAMPLE 6

*Aluminum chloride aureomycin complex—isoelectric precipitation*

50 grams (0.10 mole) of aureomycin as the free base was suspended in 350 milliliters of ethanol at 15° C. The suspension was then treated with 24.1 grams (0.10 mole) of aluminum chloride hexahydrate in 40 milliliters of distilled water, also at 15° C. A clear solution of the complex was rapidly obtained. The pH was raised to 6.0 with 5% sodium hydroxide and the precipitate thinned by the addition of an additional 150 milliliters of alcohol. The thus formed precipitate of the aluminum chloride complex of aureomycin was collected by filtration, washed with acetone, and dried in vacuo. Thereby was obtained 73 grams of a yellow amorphous powder assaying 617 micrograms per milligram as aureomycin. This particular material was tested and found to be soluble to the extent of 700–800 micrograms per milliliter at a pH of above 5 (as formed).

This "pH 6" precipitate, from the isoelectric precipitation is comparatively insoluble in methanol. When reconstituted in water the pH is between 5 and 6, even though only soluble to the extent of 0.08%.

The solid when heated starts to discolor at above 100° C., and darkens with decomposition over a range to about 200° C., depending upon the size of sample and rate of heating, but does not have a characterizable melting point.

When acidified to below 4.5 the material rapidly becomes more soluble as the acidity is increased and is soluble to the extent of at least 100 milligrams per milliliter. The material is soluble in acid and alkali, and gives a negative ferric chloride test which slowly becomes positive. The material is non-irritating when injected intramuscularly in doses of 100 milligrams and is only very slightly irritative when 200 milligrams are injected. It is readily removed from the site of injection. The water-soluble form is non-irritating to the mucous membrane of the nose even when acidified to a pH of 3.0. The complex is at least as stable as aureomycin itself in aqueous solution.

The material may be suspended in an oil, such as peanut oil or sesame oil, or other suitable oil carrier, and the suspension injected subcutaneously or intramuscularly; the aureomycin being utilized from the deposited crystals. It may be injected as an aqueous slurry.

When used orally, the aluminum chloride complex, such as that resulting from the isoelectric precipitation, causes less nausea than aureomycin as the hydrochloride.

EXAMPLE 7

*The cobaltous-chloride complex of aureomycin*

5.0 grams of the crystalline free base of aureomycin was suspended in 100 milliliters of anhydrous methanol and thereto added a solution of 2.4 grams of cobaltous chloride hexahydrate dissolved in 20 milliliters of methanol. The deep blue color of the cobalt rapidly disappeared leaving a clear red solution. Removal of the solvent in vacuo left behind an emerald green solid. This was triturated with ether, collected and dried, yielding 6.8 grams which assayed 623 micrograms per milligram. The product is only slightly soluble in water but may be suspended in oil and used in this form.

EXAMPLE 8

*Aureomycin stannous chloride*

1.9 grams of stannous chloride in 50 milliliters of anhydrous methanol was added to a suspension of 5 grams of crystalline aureomycin free base dissolved in 50 milliliters of methanol. The mixture was heated on a steam bath but not all of the material dissolved. Removal of the solvent in vacuo left behind the light yellow aureomycin stannous chloride complex.

EXAMPLE 9

*Aureomycin stannic chloride complex*

3.5 grams of stannic chloride pentahydrate in 50 milliliters of anhydrous methanol had added to it 5 grams of aureomycin free base in the same solvent. The material dissolved immediately. The solvent was removed in vacuo and a light yellow powder obtained which was triturated with ether, collected and dried. The material is slightly soluble in water, very soluble in methanol and acetone and in warm propylene glycol. The pH of the complex in aqueous propylene glycol is 1.0 which may be adjusted to a pH of 6.0 without precipitation even at 100 milligrams of the complex per milliliter. The solid assays 560 micrograms of aureomycin per milligram.

EXAMPLE 10

*Aureomycin-zinc chloride complex*

5 grams of aureomycin as the crystalline free base was mixed with 100 milliliters of acetone and thereto added 1.36 grams zinc chloride dissolved in 50 milligrams of acetone. After the materials reacted and the solvent removed by vacuum, there was obtained a light yellow powder which assayed 691 micrograms per milligram of aureomycin. The solid was slightly soluble in water, was soluble in propylene glycol on gentle warming, but precipitated out above a pH of 4.0.

EXAMPLE 11

*Aureomycin-boron fluoride complex*

Boron fluoride as the ethereate was dissolved in methanol and added to a suspension of the aureomycin free base in methanol in equimolecular proportions. A brilliant red solution formed immediately. The aureomycin-boron fluoride complex was isolated by removal of the solvent. The material assayed 167 micrograms per milliliter. The product gives a brilliant red solution in water, is soluble in acetone, but is insoluble in ether. A light yellow solution is obtained in 50% propylene glycol. Boron fluoride dissolved in methanol and ignited burns with a typical green boron flame. The boron complex of aureomycin, when dissolved in methanol and ignited gives no color flame test, thereby indicating that the boron must be very tightly bound.

EXAMPLE 12

*Magnesium chloride aureomycin complex*

The magnesium chloride aureomycin complex was prepared in methanol using the procedures of the preceding example, starting with 5.0 grams of aureomycin free base and 2.0 grams of magnesium chloride hexahydrate. The product was isolated by evaporation of the solvent in the form of a light yellow amorphous powder analyzing 714 micrograms per milligram. The compound obtained is slightly soluble in cold water, fairly soluble in hot water and gives a strong ferric chloride test.

EXAMPLE 13

*Ferric chloride aureomycin complex*

To 2.5 grams of aureomycin as the crystalline free base in 50 milliliters of ethanol was added 1.4 grams of ferric chloride hexahydrate in 25 milliliters of ethanol. The suspended solids dissolved at once, giving an extremely dark red solution. The removal of the solvent gave a brownish black solid which was very soluble in water. The aqueous solution formed had a pH of 1.40. The solid analyzed 431 micrograms per milligram.

EXAMPLE 14

*Nickel chloride aureomycin complex*

2.5 grams of aureomycin as the crystalline free base was suspended in 50 milliliters of methanol and treated with 1.20 grams of nickelous chloride hexahydrate dissolved in 50 milliliters of ethanol. A clear solution was obtained at once. Removal of the solvent in vacuo left behind a greenish-yellow powder which is very soluble in water yielding a solution with a pH of 2.1. The solid tested 596 micrograms per milligram; and gives a positive ferric chloride test.

EXAMPLE 15

*Aluminum bromide aureomycin complex*

A solution of aluminum bromide in water was prepared by the addition of water to anhydrous aluminum bromide (very violent reaction). To the solution was added equimolecular proportions of dry aureomycin. The aureomycin dissolved, forming a yellowish-brown solution from which the aluminum bromide complex was recoverable by freezing and evaporation of the moisture. The material is satisfactory for aureomycin therapy in those instances where the sedative effect of the bromide ion is either desired or not found harmful.

Other solvents and other salts may be used in the preparation of our complexes; but further examples would serve to confuse the scope of invention rather than clarify it.

Other solvents than alcohol, water and acetone may be used but it is necessary to use a solvent which is compatible with both the metallic chloride, the starting form of aureomycin, and the final form of the aureomycin complex. The use of other alcohols, ketones, cellosolves, etc. is feasible but the advantages on a commercial cost basis indicate the lower aliphatic alcohols and water, or mixtures thereof, to be the solvents most commercially practical.

Because of the insolubility of some of the other metallic halides the aluminum chloride complex is more convenient where solutions are needed but where it is desired that the aureomycin be permitted to remain as a depot in the tissue, other of the complexes which are more difficultly soluble may be used thereby prolonging the period of action.

Having thus described certain of the aspects thereof, as our invention we claim:

1. A method of preparing an aureomycin-metallic halide complex which comprises reacting aureomycin in a solvent selected from the group consisting of aliphatic alcohols and ketones and water, said water being at a pH below 6, with a metallic halide selected from the group consisting of the halides of aluminum, cobalt, and magnesium, in the presence of at least sufficient base to neutralize any acid associated with the aureomycin, removing the solvent, and recovering the thus formed aureomycin-metallic halide complex.

2. A method of preparing an aluminum chloride aureomycin complex which comprises reacting a material containing aureomycin selected from the group consisting of aureomycin hydrochloride, aureomycin free base, the sodium salt of aureomycin and the ethylenediamine salt of aureomycin in a solvent selected from the group consisting of aliphatic alcohols and ketones and water, said water being at a pH below 6, with a solution of aluminum chloride, thereby forming the aluminum chloride complex of aureomycin.

3. A method of preparing an aluminum chloride aureomycin complex which comprises reacting aureomycin free base with aluminum chloride in a solvent selected from the group consisting of aliphatic alcohols and ketones and water, said water being at a pH below 6, thereby forming the aluminum chloride complex of aureomycin.

4. A method of preparing an aluminum chloride aureomycin complex which comprises reacting the sodium salt of aureomycin with aluminum chloride in a solvent selected from the group consisting of aliphatic alcohols and ketones and water, said water being at a pH below 6, thereby forming the aluminum chloride complex of aureomycin.

5. A method of preparing an aluminum chloride aureomycin complex which comprises reacting the ethylenediamine salt of aureomycin with aluminum chloride in a solvent selected from the group consisting of aliphatic alcohols and ketones and water, said water being at a pH below 6, thereby forming the aluminum chloride complex of aureomycin.

6. A method of preparing an aluminum chloride aureomycin complex which comprises reacting aureomycin hydrochloride and aluminum chloride in a solvent selected from the group consisting of aliphatic alcohols and ketones and water, said water being at a pH below 6, in the presence of at least approximately as many moles of a base as moles of aureomycin hydrochloride, thereby forming the aluminum chloride complex of aureomycin.

7. A method of preparing an aluminum chloride aureomycin complex which comprises reacting a material containing aureomycin selected from the group consisting of aureomycin hydrochloride, aureomycin free base, the sodium salt of aureomycin, and the ethylenediamine salt of aureomycin with aluminum chloride in a solvent selected from the group consisting of aliphatic alcohols and ketones and water, said water being at a pH below 6, in the presence of at least sufficient base to neutralize any acid associated with the material containing aureomycin selected from said group, thereby forming the aluminum chloride complex of aureomycin.

8. A metallic halide complex of aureomycin formed by reacting in a solvent selected from the group consisting of aliphatic alcohols and ketones and water, said water being at a pH below 6, aureomycin and a salt selected from the group consisting of the halides of aluminum, cobalt and magnesium.

9. An aureomycin aluminum chloride complex.

10. An aureomycin aluminum bromide complex.

11. An aureomycin cobalt chloride complex.

12. An aureomycin magnesium chloride complex formed by reacting aureomycin and magnesium chloride in an aqueous solution at a pH of less than 6.

JOSEPH F. WEIDENHEIMER.
CHARLES C. REED.
LAWRENCE RITTER.
SIDNEY D. UPHAM.

References Cited in the file of this patent

UNITED STATES PATENTS

| Number | Name | Date |
|---|---|---|
| 2,474,758 | Peck | June 28, 1949 |

OTHER REFERENCES

Braley in Annals N. Y. Academy of Sciences, vol. 51, art. 2, Nov. 30, 1948, page 280.

Brook in J. Biol. Chem., vol. 165, Oct. 1946, p. 467.

Broschard on Aureomycin in Science, vol. 109, Feb. 25, 1949, pp. 199–200.